United States Patent [19]
Merrell

[11] Patent Number: 5,787,469
[45] Date of Patent: Jul. 28, 1998

[54] SYSTEM AND METHOD FOR EXCLUSIVELY WRITING TAG DURING WRITE ALLOCATE REQUESTS

[75] Inventor: Quinn W. Merrell, Aloha, Oreg.

[73] Assignee: Intel Corporation, Santa Clara, Calif.

[21] Appl. No.: 709,164

[22] Filed: Sep. 6, 1996

[51] Int. Cl.$^6$ .................................................. G06F 12/08
[52] U.S. Cl. ..................... 711/122; 711/119; 711/143; 711/144
[58] Field of Search ........................ 395/449, 470, 395/448

[56] References Cited

U.S. PATENT DOCUMENTS

| | | | |
|---|---|---|---|
| 5,251,308 | 10/1993 | Frank et al. | 395/490 |
| 5,555,392 | 9/1996 | Chaput et al. | 395/445 |
| 5,561,779 | 10/1996 | Jackson et al. | 395/449 |
| 5,623,628 | 4/1997 | Brayton et al. | 395/468 |
| 5,627,992 | 5/1997 | Barro | 395/460 |

*Primary Examiner*—Eddie P. Chan
*Assistant Examiner*—Gary J. Portka
*Attorney, Agent, or Firm*—Blakely, Sokoloff, Taylor & Zafman

[57] ABSTRACT

Implemented within a computer system, a cache memory element having a cache hierarchy including a first level cache and at least a second level cache. In the event that a processor core requests a copy of a selected cache line and intends to modify contents of the selected cache line and the selected cache line cannot be supplied by the first or second level cache, tag information is solely written into the second level cache and higher level caches. This preserves databus bandwidth and enhances performance of the computer system.

18 Claims, 5 Drawing Sheets

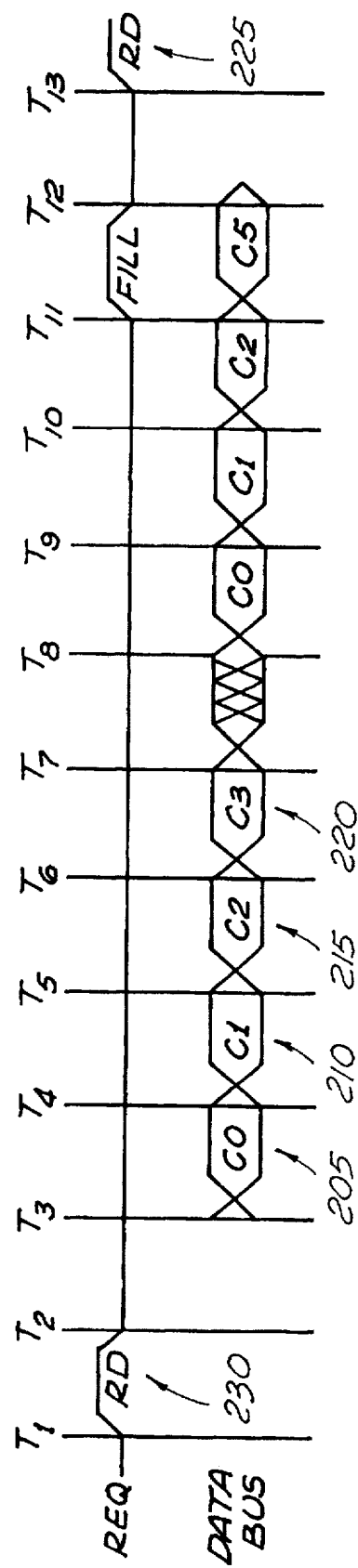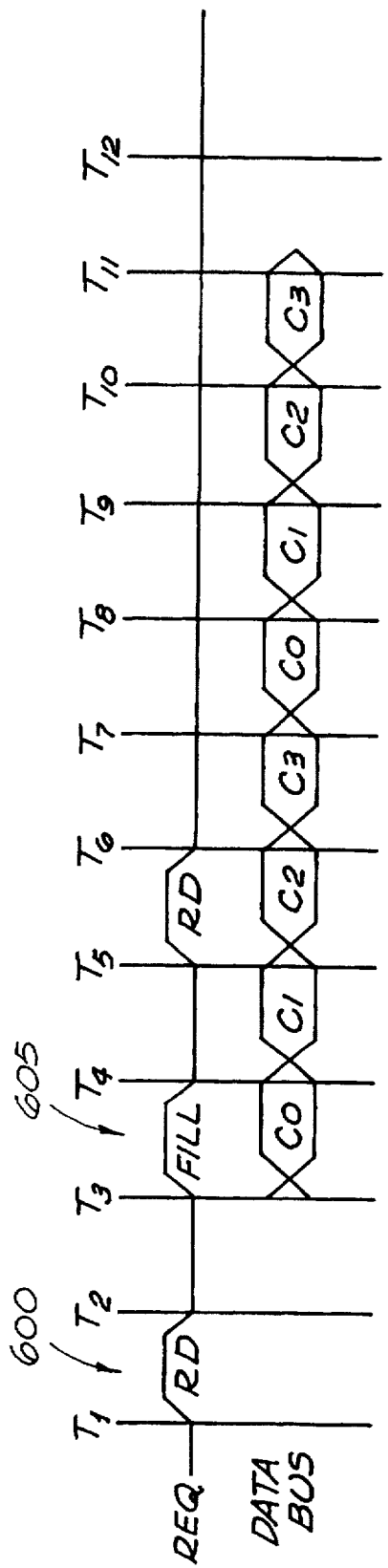

SYSTEM AND METHOD FOR EXCLUSIVELY WRITING TAG DURING WRITE ALLOCATE REQUESTS

BACKGROUND OF THE INVENTION

1. Field of the Invention

The present invention relates to the field of cache memory. More specifically, the present invention relates to a system and method for preventing data from being written into one or more cache line(s) during a write request.

2. Description of Art Related to the Invention

For many years, computer systems have implemented a central processing unit ("CPU") which operates at a substantially faster speed than its main memory. In an effort to accelerate computations by the CPU and to buffer copies of data and instructions of frequently referenced memory locations in main memory, cache memory has been implemented within the computer system.

A "cache" is a relatively small and very fast memory, usually static random access memory ("SRAM"), in close proximity to the CPU. As shown by the conventional memory hierarchy in FIG. 1, cache 100 is organized in a hierarchical structure 110 in which the lowest level cache (e.g., level-one "L1" cache) $120_1$ is implemented closer in spatial proximity to a processor core 130 than the next higher level cache (e.g., level 2 "L2" cache) $120_2$. The same cache hierarchy is used for additional higher level caches such as level-two "L2" caches through L(x) cache $120_x$ (where "x" is a positive whole number, x>2).

A cache may be configured to support a number of functions such as blocking (or non-blocking) and write-back (or write-through) functionality. Such functionality is not mutually exclusive. For example, a "blocking" cache is configured to process requests in a sequential manner. Thus, no request is accepted until a previous request has been completed. Conversely, "non-blocking" cache may continue to accept other requests even though a previous request has not been completed. As a result, non-blocking cache are commonly used to support pipelined bus architectures.

Additionally, a "write-back" cache allows data within a single cache line of the cache hierarchy, normally a cache line of L1 cache, to be exclusively modified. The other cache lines associated with higher level caches are not modified, but now contain invalid data. A higher level cache would receive the modified data upon eviction from its immediately lower level cache. A "write-through" cache is configured so that modifying data in the L1 cache causes subsequent modifications in corresponding cache lines of higher level caches.

Currently, when the processor core 130 requests cacheable data, the request ascends the cache hierarchy, starting at the lowest level cache, until the requested data is located in one of the caches $120_1$–$120_x$ or main memory 140. If the cache hierarchy abides by an allocation policy with inclusion properties (e.g., higher level caches are configured to contain memory references of lower level cache), when data is supplied, all caches having a lower level than the device supplying the requested data (e.g., caches $120_1$–$120_x$ if main memory 140 supplies data), allocate a cache line by writing the requested data and the cache line's corresponding tag into each of the caches $120_1$–$120_x$. This operation is performed to preserve the contents of the cache line in the higher levels of the cache hierarchy (e.g., L2 cache 120 . . . , L(x) cache $120_x$) in the event that the cache line is evicted from L1 cache, normally smaller in size than its higher level caches.

It is evident that the writing of data into the cache structure 110 consumes databus bandwidth. In accordance with conventional memory management as described above, if the processor core requests a copy of a cache line to be placed with the cache hierarchy with the intention to modify its contents, commonly referred to as a "Write Allocate request," servicing of this request causes all caches, with the exception of the L1 cache within which the modified data from the processor core is written, to be allocated with an unmodified (stale) copy of the cache line. As a result, bandwidth of the databus is not utilized in an optimal manner.

Furthermore, in the cache hierarchy, the relative latency required to allocate a cache line into a cache tends to increase in relation to its cache level. Also, the relative rate at which the cache can accept requests tends to decrease in relation to its cache level. The adverse effect can be that new requests, originating from the processor core and needing service by upper level caches, may experience longer latency due to prior requests still requiring servicing.

For example, as shown in FIG. 2 in which a write-back, non-blocking cache experiences a cache hit during a first read request, followed by queuing of a data fill from a previous cache miss and a second read request, the latency experienced by the system is shown. Such latency is clearly evident when the bit width of the databus of the system is smaller than the size of the cache line, thereby requiring multiple cycles to write data to the cache. For the cache line possessing a bit width four times greater than the bit width of the databus, four (4) databus cycles 205–220 are required to read or write a cache line of data. Thus, while bi-directional databus is occupied with the data fill, generally defined as writing data to caches to maintain coherency, the second read access 225 must be stalled until one clock cycle after the data has been written. In this case, the subsequent read cache access 225 at $T_{13}$ would occur twelve (12) databus clock cycles after a prior read cache access 230 at $T_1$.

Thus, it would be advantageous to provide a system and cache management technique that, when allocating a cache line in a L2 cache or a higher level cache during the Write Allocate request, databus bandwidth and cache occupancy may be preserved by writing the tag only and neglecting to write the data. This may give a boost to system performance and/or the performance of the processor as well.

SUMMARY OF THE INVENTION

Implemented within a computer system including main memory and a microprocessor having a processor core, a cache having a cache hierarchy including a first level cache and at least one high level cache such as a second level cache and perhaps a third level cache. The cache may be partially or completely integrated within the microprocessor, and in the alternative, partially or completely external from the microprocessor. In the event that (i) the processor core requests a copy of a selected cache line to be placed within the cache hierarchy and intends to modify contents of the selected cache line, and (ii) the selected cache line cannot be supplied by the first or second level cache, tag information is solely written into the second level cache and higher level caches. This preserves databus bandwidth and enhances performance of the computer system.

BRIEF DESCRIPTION OF THE DRAWINGS

The features and advantages of the present invention will become apparent from the following detailed description of an embodiment of the present invention in which:

FIG. 2 is a timing diagram illustrative of the latency delays experienced with conventional memory management during a Write Allocate request when the cache line is four times larger in bit width than the databus.

FIG. 6 is a timing diagram illustrative of reduced latency delays produced by the memory management scheme set forth in FIG. 5 during a Write Allocate request when the cache line is four times larger in bit width than the databus.

DETAILED DESCRIPTION OF THE INVENTION

In its preferred embodiment, the present invention relates to a system and method for managing cache to optimize system performance. In the following description, numerous details are set forth in order to provide a thorough understanding of the present invention. It will be obvious, however, to one skilled in the art that these specific details may be avoided without departing from the spirit and scope of the present invention.

Some terminology is used to discuss certain well-known technical terms. For example, the term "cache line" includes a tag field and a data field. The tag field contains a tag which is a plurality of bits utilized to identify an address in main memory in which particular data is currently being stored. The data field contains the data being requested for reading or writing purposes.

Figure 1:
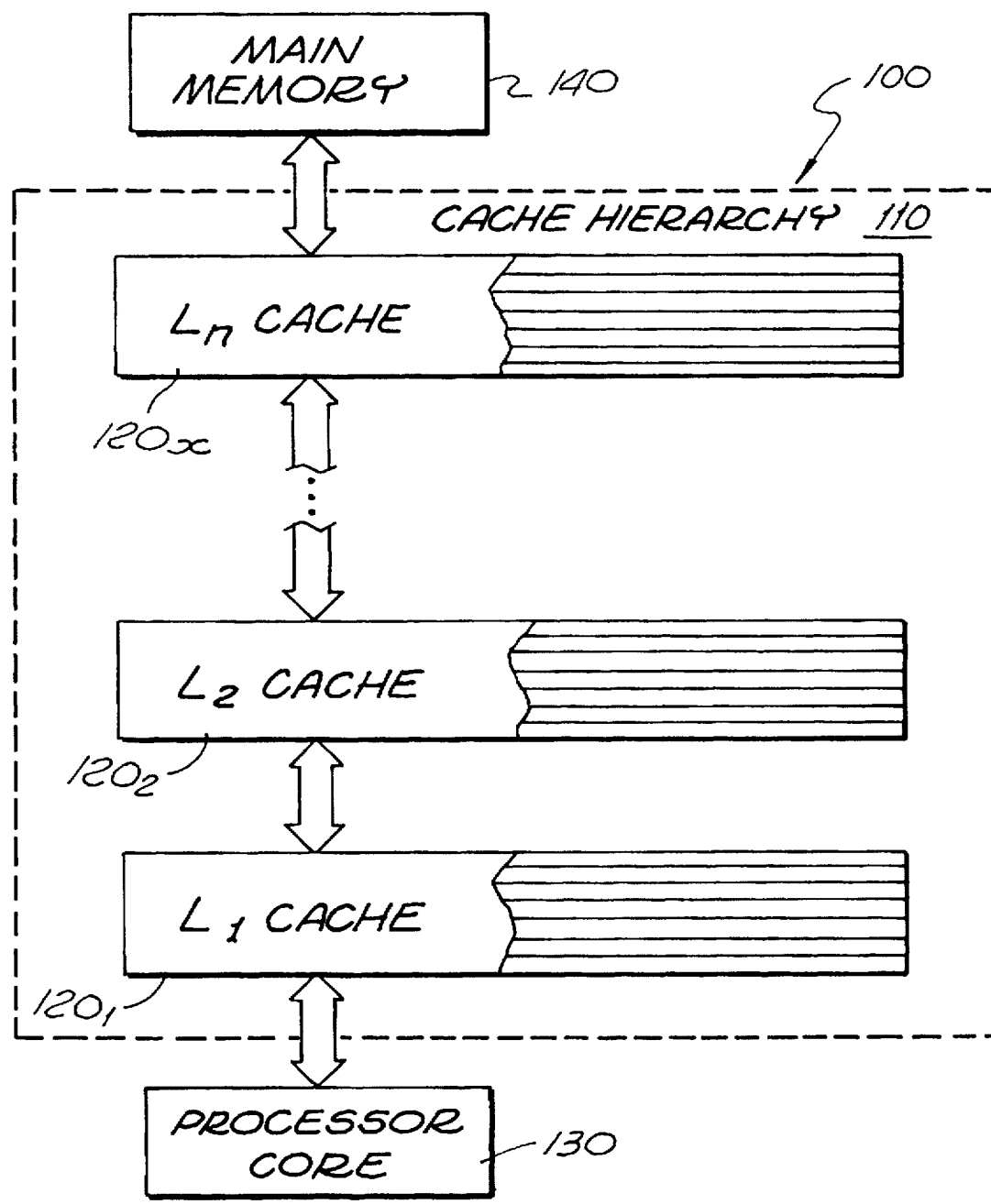
FIG. 1 is a block diagram of a conventional memory hierarchy.
Figure 3:
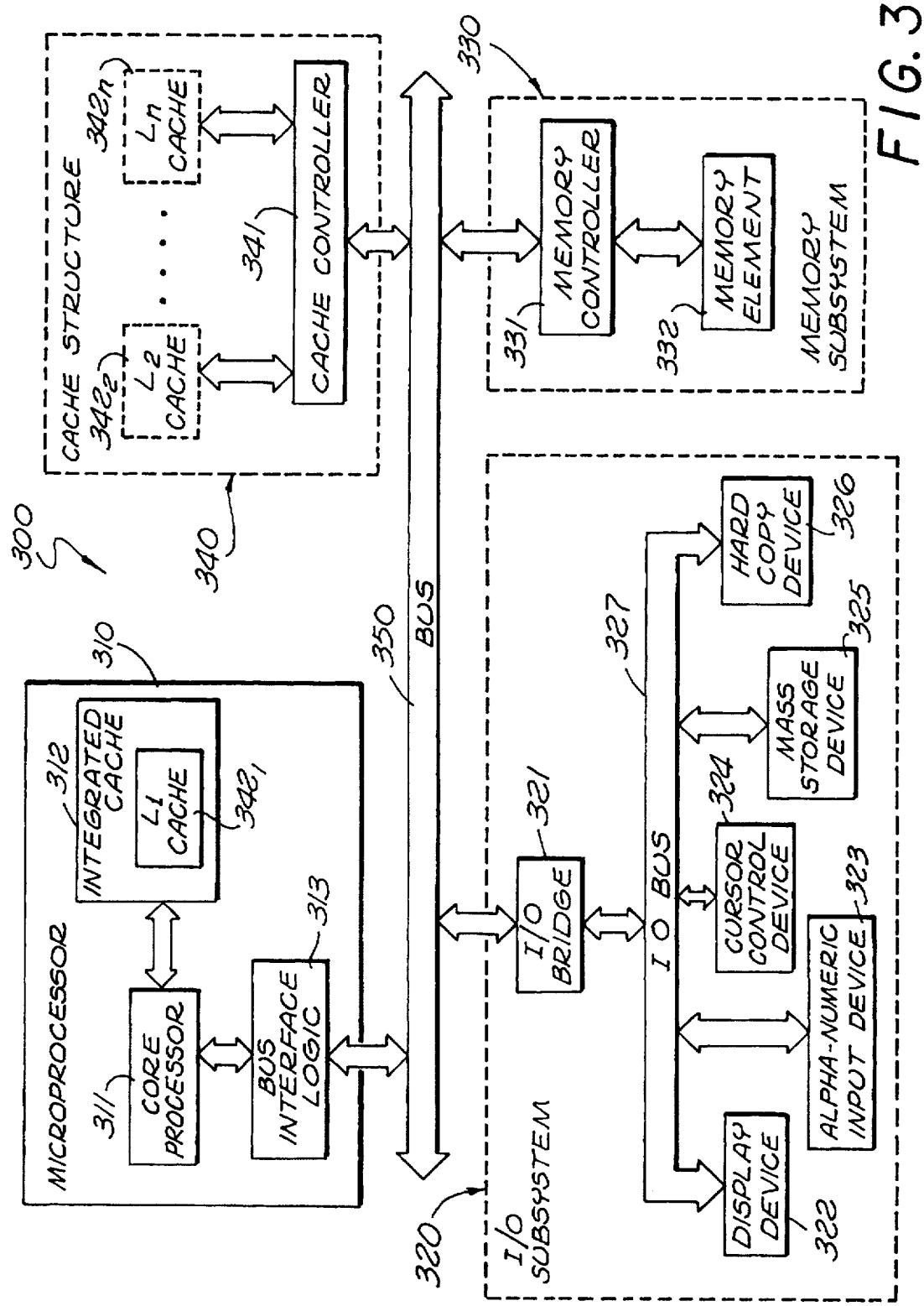
FIG. 3 is a block diagram of a computer system implementing the present invention.

Referring to FIG. 3, an embodiment of a computer system incorporating the present invention is shown. The computer system 300 includes a microprocessor 310 coupled via a bus 350 to an input/output ("I/O") subsystem 320, a memory subsystem 330 and an optimal cache structure 340. Preferably, microprocessor 310 includes a processor core 311, being an integrated circuit chip responsible for performing the operations of the microprocessor 310, and an on-chip integrated cache 312. In this embodiment, the integrated cache 312 includes a first level ("L1") cache $342_1$ preferably having write-back and non-blocking functionality. It is contemplated that other levels of cache (e.g., L2 cache, etc.) may be implemented on-chip within the integrated cache 312 while the remainder of cache levels may be optimally implemented off-chip, or that all levels of cache, including L1 cache $342_1$, may be implemented off-chip within the cache structure 340.

The processor core 311 is coupled to the bus 350 through bus interface logic 313. The bus interface logic 313 may include queue(s) and other logic in order to control the allocation of information within the integrated cache 312. It is contemplated that microprocessor 310 may be configured in accordance with Intel® Microprocessor Architectures (e.g., Pentium™, Pentium Pro™) or other types of architectures.

As further shown, in this embodiment, I/O subsystem 320 includes an I/O bridge 321 which provides a communication path between bus 350 and a number of peripherals coupled to bus 350. These peripheral include, but are not limited to, a display device 322 (e.g., a flat panel display, a cathode ray tube monitor, etc.), an alphanumeric input device 323 (e.g., keyboard, number pad, etc.), a cursor control device 324 (e.g., mouse, track ball, joystick, pen, touch pad, etc.), mass storage device 325 (e.g., a hard disk drive, cassette drive, etc.), and hard copy device (e.g., a printer) 326. These peripherals are coupled to I/O bridge 321 through an I/O bus 327. The I/O bridge and bus combination may be a Peripheral Component Interconnect ("PCI") bridge unit coupled to the PCI bus. Additionally, although not shown, one or more of the above-identified peripheral devices may be coupled to an Industry Standard Architecture ("ISA") bus coupled to an ISA bridge unit.

The memory subsystem 330 includes a memory controller 331 coupled between bus 350 and a memory element 332. The memory controller 331 controls the communications between agents (e.g., microprocessor 310, peripherals, etc.) having access to the bus 350 and the memory element 332.

The memory element 332 includes a set of dynamic random access memories ("DRAMs"); however, other types of memory are foreseeable.

Optionally, the cache structure 340 includes a cache controller 341 coupled between bus 350 and one or more levels of cache $342_2$–$342_n$ ("n" being a positive whole number), preferably ranging from L2 cache $342_2$ to L(n) cache $342_n$, provided the L1 cache $342_1$ is implemented within microprocessor 310 as shown in this embodiment. Each of these caches $342_2$–$342_n$ preferably operates as a write-back, non-blocking cache, although system latency may be reduced even if caches $342_2$–$342_n$ have blocking functionality. The cache controller 341 routes requests in hierarchical sequence to cache $342_2$–$342_n$ as illustrated in FIG. 4.

Figure 4:
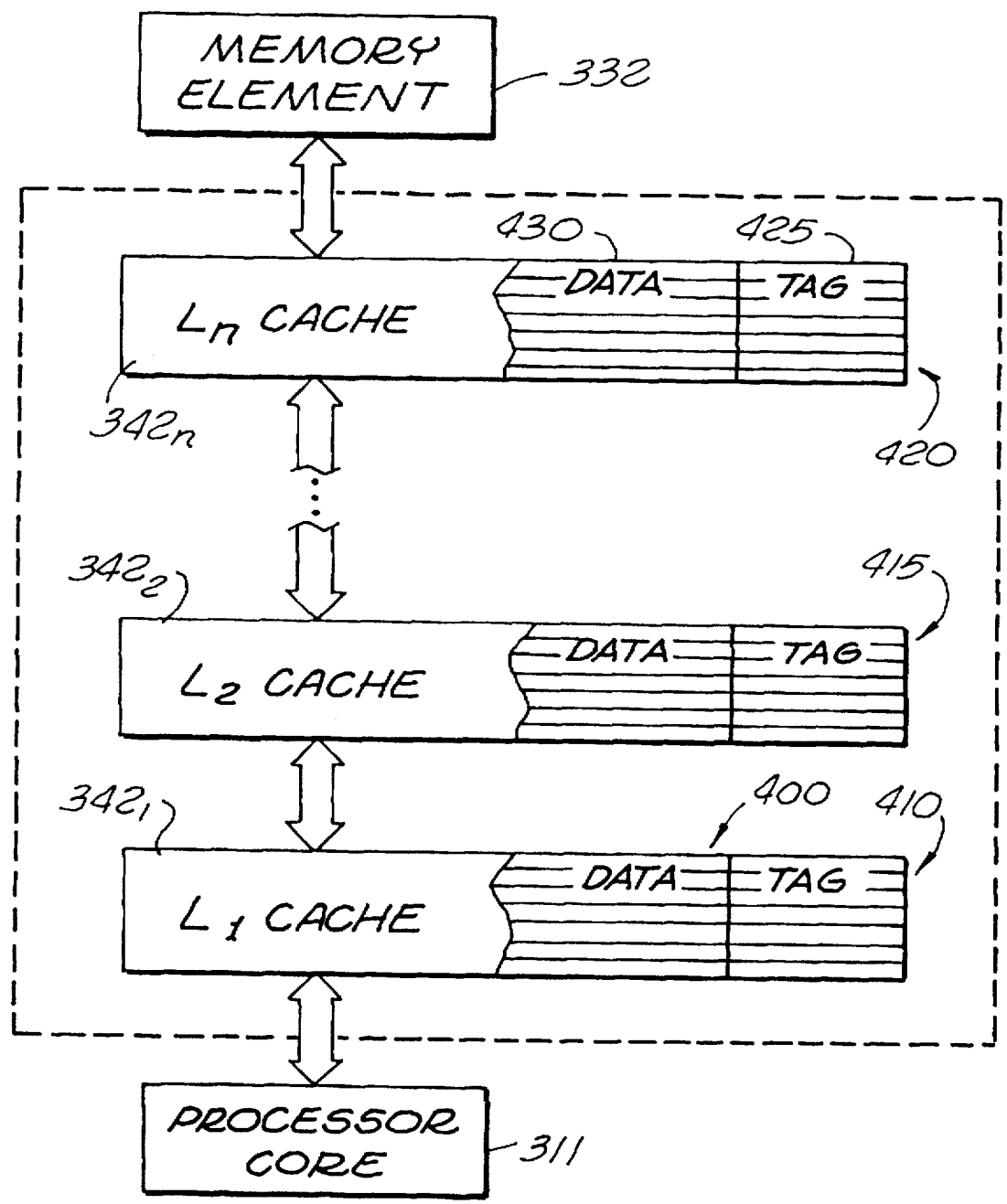
FIG. 4 is a block diagram of the memory hierarchy presented by the computer system.

Referring now to FIG. 4, the memory hierarchy of a computer system of FIG. 3 is shown. When the processor core 311 issues a read request, the result of a memory load by the processor core 311, the lowest level cache (e.g., L1 cache $342_1$) is checked to determining whether it contains the requested data. This check is accomplished by comparing the address of the requested data to the contents of the tag fields 400 of each cache line of the L1 cache $342_1$. If the desired data is found to be stored in the L1 cache $342_1$, normally referred to as a "cache hit," the desired data is immediately available to the processor core 311.

However, if the desired data is not stored in the L1 cache $342_1$, normally referred to as a "cache miss," the contents of the next higher level of cache (e.g., L2 cache $342_2$) is checked. If the desired data is stored in the L2 cache $342_2$, the data is loaded into both the L1 cache $342_1$ and the processor core 311. Otherwise, the process continues until the contents of each higher level cache have been successively checked in the manner described above. If the desired data is not contained in any of the caches $342_1$–$342_n$, the desired data is retrieved from slower memory such as memory element 332. Thereafter, the desired data is placed into cache lines allocated for each level of the cache structure 340 (e.g., L1 cache $342_1$, L2 cache $342_2$, etc.), as well as delivered to the processor core 311 of the microprocessor.

Figure 5:
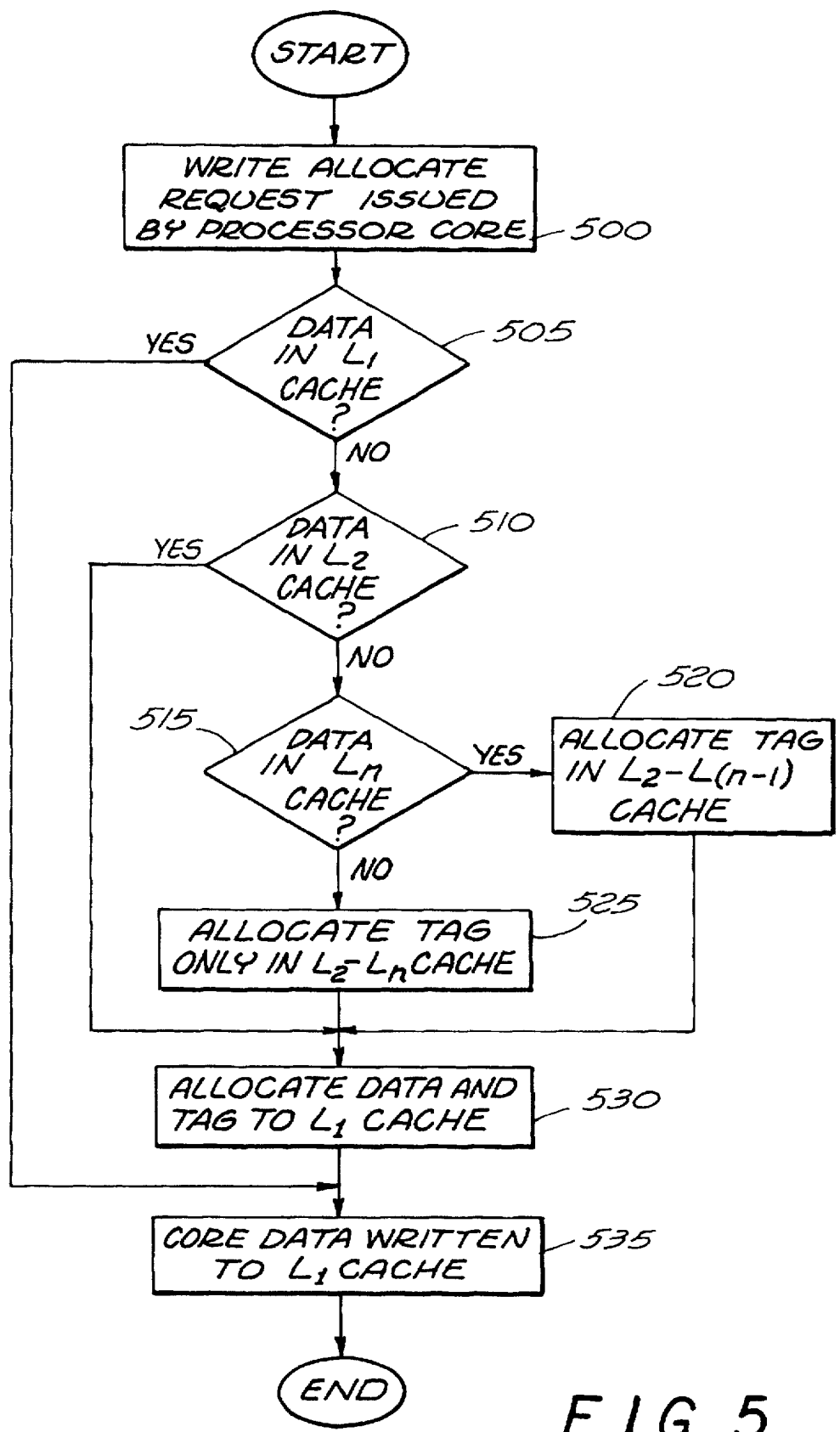
FIG. 5 is a flowchart illustrating a memory management scheme performed upon the cache structure during a Write Allocate request.

Referring now to both FIGS. 4 and 5, when the processor core 311 issues a write request, such as a Write Allocate request requesting that its data (referred to herein as "core data") be written into a particular memory address, the lowest level cache (e.g., L1 cache $342_1$) is initially checked for determining whether it contains a cache line having a tag with the particular memory address (Steps 500–505). If a cache hit occurs (e.g., in cache line 410), the processor core 311 writes the core data, into the cache line 410 of the L1 cache $342_1$ (Step 535). However, if a cache miss occurs, the contents of the next higher level of cache (e.g., L2 cache $342_2$) are checked (Step 510).

If L2 cache $342_2$ contains the particular memory address in one of its cache lines (e.g., cache line 415 of L2 cache $342_2$), three possible write schemes may be used. First, the tag and data of the cache line 415 may be written from the L2 cache $342_2$ into the L1 cache $342_1$ (Step 530). Subsequently, the core data is written over the data contained recently copied into the L1 cache $342_1$ (Step 535). Alternatively, the data of cache line 415 may be written into a buffer (not shown) proximate to the L1 cache $342_1$. This core data is written over the data being written into the L1 cache $342_1$. The final write scheme is where a cache line of core data is written into the buffer and portions of the cache line is masked. The data of cache line 415 writes over the unmasked portion of the cache line before the buffer is written to the L1 cache $342_1$.

This process continues until the entire contents of the highest level of cache (e.g., L(n) cache $342_n$) has been checked (Step 515). If a cache hit occurs in cache levels higher than L2 cache, such as at cache line 420 of L(n) cache $342_n$ for example, instead of writing the entire contents of cache line 420 into each cache level $342_1$–$342_n$, the tag 425 of cache line 420 is only written into a first group of cache, namely L2 cache $342_2$ up to L(n−1) cache $342_{n-1}$ with the exception of L1 cache $342_1$. For L1 cache $342_1$, the entire contents of cache line 420; namely the tag 425 and data 430, are written into a selected cache line in accordance with one of the three write schemes discussed above. Thus, the selected cache line of the L1 cache $342_1$ would include the tag from cache line 420 and the core data.

However, if a cache miss occurs for the L(n) cache $342_n$, the data associated with the particular memory address is requested from the slower main memory. The memory address associated with the retrieved data is allocated into a tag field of a chosen cache line for each cache level (e.g., L2 cache through L(n) cache $342_2$–$342_n$) with the exception of L1 cache $342_1$. For L1 cache $342_1$, the address and data from the memory element are written into a tag and data field of a selected cache line in accordance with one of the three write schemes discussed above.

Referring now to FIG. 6, the memory management scheme illustrated in FIGS. 4–5, enables the average latency of a data fill to be reduced by writing data only when necessary. As shown, a cache read access 600 can easily be pipelined behind a tag write access 605 during a data fill because there is no databus collision between the two requests. Thus, the latency between read cycles caused by the fill is 4 cycles opposed to 12 cycles as shown in FIG. 2.

The present invention described herein may be designed in many different embodiments as evident to one skilled in the art than those described without departing from the spirit and scope of the present invention. The invention should, therefore be measured in terms of the claims which follow.

What is claimed is:

1. A computer system comprising:
   a memory element; and
   a microprocessor coupled to the memory element, the microprocessor including
   a processor core,
   a multi-level integrated cache coupled to the processor core, the integrated cache including a first level cache and at least one high level cache, and
   a logic element that controls allocation of data and tag information into the integrated cache, the logic element only writing tag information of a selected cache line which includes tag and data to the at least one high level cache when the processor core issues a Write Allocate request and data requested by the processor core is located in one of the at least one high level cache and the memory element.

2. The computer system according to claim 1, wherein the integrated cache is a write-back cache.

3. The computer system according to claim 2, wherein the integrated cache possesses non-blocking functionality.

4. The computer system according to claim 2, wherein the at least one high level cache includes a second level cache.

5. The computer system according to claim 4, wherein the at least one high level cache further includes a third level cache.

6. The computer system according to claim 2, wherein the logic element is a bus interface logic.

7. A computer system comprising:
   a memory element; and
   a microprocessor coupled to the memory element, the microprocessor including
   a processor core, and
   a multi-level integrated cache coupled to the processor core, the integrated cache including a first level cache and at least one high level cache, wherein only tag information of a selected cache line which includes tag and data is written into the at least one high level cache upon the processor core requesting a copy of the selected cache line and intending to modify the contents of the selected cache line with information supplied by one of the at least one high level cache and the memory element.

8. The computer system according to claim 7, wherein the integrated cache is a write-back cache.

9. The computer system according to claim 8, wherein the integrated cache possesses non-blocking functionality.

10. The computer system according to claim 8, wherein the at least one high level cache of the integrated cache includes a second level cache.

11. The computer system according to claim 10, wherein the at least one high level cache of the integrated cache further includes a third level cache.

12. The computer system according to claim 11, wherein the at least one high level cache of the integrated cache further includes a cache having a level higher than the third level cache.

13. A computer system comprising:
   a memory element;
   a microprocessor coupled to the memory element, the microprocessor including
   a processor core, and
   an integrated cache coupled to the processor core, the integrated cache including at least a first level write-back cache; and
   a cache structure coupled to the microprocessor, the cache structure including at least one high level write-back cache, wherein only tag information of a selected cache line which includes tag and data is written into the at least one high level write-back cache if the microprocessor requests a copy of the selected cache line from one of the at least one high level cache and the memory element to modify the contents of the selected cache line.

14. The computer system according to claim 13, wherein the at least one high level cache includes a second level write-back cache and a third level write-back cache.

15. The computer system according to claim 13, wherein the integrated cache includes a second level write-back cache.

16. A computer system comprising:

memory means for storing information; and processor means for processing information, the processor means including cache means for temporarily storing the information to be processed by the processor means, the cache means including a first level cache and at least one high level cache, wherein only tag information of a selected cache line which includes tag and data is written into the at least one high level cache upon the processor means requesting a copy of the selected cache line from one of the at least one high level cache and the memory means to be placed within the cache means and modified.

17. The computer system according to claim 16, wherein the at least one high level cache includes a second level cache.

18. The computer system according to claim 16, wherein the at least one high level cache includes a plurality of level caches including at least a second level cache and a third level cache.

* * * * *